(12) United States Patent
Schaffer et al.

(10) Patent No.: US 10,131,363 B2
(45) Date of Patent: Nov. 20, 2018

(54) VEHICLE WITH MODE GUIDANCE

(71) Applicant: Ford Global Technologies, LLC, Dearborn, MI (US)

(72) Inventors: Daniel Mark Schaffer, Brighton, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 15/332,862

(22) Filed: Oct. 24, 2016

(65) Prior Publication Data
US 2018/0111627 A1  Apr. 26, 2018

(51) Int. Cl.
| | | |
|---|---|---|
| *B60W 50/08* | (2012.01) | |
| *B60W 50/14* | (2012.01) | |
| *B60W 10/04* | (2006.01) | |
| *B60W 10/20* | (2006.01) | |
| *B60W 10/22* | (2006.01) | |
| *B60W 40/09* | (2012.01) | |
| *B60W 40/08* | (2012.01) | |

(52) U.S. Cl.
CPC ......... *B60W 50/082* (2013.01); *B60W 10/04* (2013.01); *B60W 10/20* (2013.01); *B60W 10/22* (2013.01); *B60W 40/09* (2013.01); *B60W 50/14* (2013.01); *B60W 2040/0863* (2013.01); *B60W 2050/146* (2013.01); *B60W 2420/52* (2013.01); *B60W 2520/14* (2013.01); *B60W 2550/14* (2013.01)

(58) Field of Classification Search
CPC .... B60W 50/082; B60W 50/14; B60W 10/04; B60W 10/20; B60W 10/22; B60W 40/09
See application file for complete search history.

(56) References Cited

U.S. PATENT DOCUMENTS

| | | | |
|---|---|---|---|
| 7,162,346 B2 | 1/2007 | Berry et al. | |
| 7,796,019 B2 | 9/2010 | Yamada | |
| 8,209,093 B2 | 6/2012 | Hill | |
| 8,447,460 B2 * | 5/2013 | Nihei | B60K 23/0808 701/29.2 |

(Continued)

FOREIGN PATENT DOCUMENTS

| | | |
|---|---|---|
| EP | 1961606 A2 | 8/2008 |
| FR | 2958590 A3 | 10/2011 |

(Continued)

OTHER PUBLICATIONS

Qu et al., "Choosing When to Interact With Learners", Proceedings of the 9th International Conference on Intelligent User Interfaces, Jan. 2004, pp. 307-309. (Year: 2004).*

(Continued)

*Primary Examiner* — Todd M Melton
(74) *Attorney, Agent, or Firm* — James P. Muraff; Neal, Gerber & Eisenberg LLP

(57) ABSTRACT

A vehicle includes: a motor, sensors, steering, a suspension, a terrain mode switch, processor(s) configured to: implement a selected terrain mode by tuning at least one of the motor, steering, and suspension; record selected terrain modes; compute a confidence factor based on the recorded selections; determine a road condition based on the sensors; display guidance based on the confidence factor and the road condition.

20 Claims, 6 Drawing Sheets

(56) References Cited

U.S. PATENT DOCUMENTS

| | | | |
|---|---|---|---|
| 8,718,862 B2 | 5/2014 | Gwozdek et al. | |
| 9,415,779 B2 * | 8/2016 | Popham | B60W 10/06 |
| 9,440,659 B2 * | 9/2016 | Kelly | G05B 19/042 |
| 9,646,428 B1 | 5/2017 | Konrardy | |
| 9,667,742 B2 | 5/2017 | Weng | |
| 2007/0182529 A1 | 8/2007 | Dobler | |
| 2011/0087398 A1 | 4/2011 | Lu et al. | |
| 2012/0095659 A1 | 4/2012 | Rodrigues et al. | |
| 2012/0212353 A1 | 8/2012 | Fung | |
| 2013/0224693 A1 | 8/2013 | Gilling et al. | |
| 2014/0156126 A1 | 6/2014 | Tran et al. | |
| 2014/0365070 A1 | 7/2014 | Yano et al. | |
| 2015/0210290 A1 | 7/2015 | Hemes et al. | |
| 2017/0101116 A1 | 4/2017 | Shubs, Jr. | |
| 2017/0305434 A1 * | 10/2017 | Ratnasingam | B60W 40/09 |

FOREIGN PATENT DOCUMENTS

| | | |
|---|---|---|
| GB | 2534174 A | 7/2016 |
| KR | 1020090093146 A | 9/2009 |

OTHER PUBLICATIONS

Search Report dated Jul. 5, 2014 for GB Patent Application No. GB 1701049.7 (3 pages).

* cited by examiner

Prior Art

VEHICLE WITH MODE GUIDANCE

TECHNICAL FIELD

This disclosure relates to automated user guidance corresponding to vehicle modes.

BACKGROUND

Newer vehicles include a plurality of modes, including various terrain modes. The various terrain modes are associated with different vehicle tunings. A first tuning may tune a suspension, an engine, and/or steering with first parameters. A second tuning may tune the suspension, the engine, and/or the steering with second parameters.

With reference to FIG. 3, a terrain mode switch 105a is located in a vehicle. Terrain mode switch 105a includes a plurality of modes 301 to 305. Modes 301 to 304 are mutually exclusive such that a user may only select one of modes 301 to 304. Mode 305 is supplemental and may be combined with any of modes 301 to 304.

Modes 301 to 304 are represented as graphics on a rotatable wheel 306. The user rotates wheel 306 until a desired mode (e.g., mode 301) aligns with an arrow graphic 308. The vehicle implements or internally tunes in accordance with the mode under arrow graphic 308. The graphic representing mode 305 is a located on a pushable and translucent button 307. When mode 305 is active, the graphic associated with mode 305 lights up. When mode 305 is inactive, the graphic is dark. The user activates and deactivates mode 305 by pushing button 307.

First mode 301 is a grass/gravel/snow mode. While in first mode 301, the vehicle performs early upshifts, reduces torque delivery at any given throttle position, and/or increases all-wheel-drive torque.

Second mode 302 is a sand mode. While in second mode 302, the vehicle delays upshifts, increases torque delivery at any given throttle position, increases all-wheel drive torque, and/or minimizes stability system interactions.

Third mode 303 is a mud or ruts mode. While in third mode 303, the vehicle holds low gearing on descent, increases all-wheel-drive torque, and/or prioritizes traction over handling. According to some embodiments, second mode 302 and third mode 303 result in identical tuning.

Fourth mode 304 is a normal mode. The description of first, second, third, and fifth modes applies fourth mode 304 as a baseline. It should be appreciated that first, second, third, and fourth mode 304 impact one or more of: torque delivery in response to a given throttle position, transmission shifting, and steering response.

Fifth mode 305 is a hill descent control. While in fifth mode 305, the vehicle manages descent by maintaining a predetermined or precalculated target speed. The vehicle maintains the target speed by remaining in a low gear and auto-braking.

Terrain mode switch 105a poses problems. Users may incorrectly assume that terrain mode switch 105a activates or deactivates all-wheel drive. Users may forget the various tunings associated with each of modes 301 to 305 and thus pick an incorrect mode for current driving conditions. A solution is needed to resolve these problems.

SUMMARY

An example of a vehicle consistent with the present disclosure includes: a motor, sensors, steering, a suspension, a terrain mode switch, processor(s) configured to: implement a selected terrain mode by tuning at least one of the motor, steering, and suspension; record selected terrain modes; compute a confidence factor based on the recorded selections; determine a road condition based on the sensors; display guidance based on the confidence factor and the road condition.

According to some embodiments, the processor(s) are configured to not compute the confidence factor based on selections recorded outside a calculated timespan.

According to some embodiments, the processor(s) are configured to: place the recorded selections into first and second groups; the first group only including selections recorded within a first timespan, the second group only including selections recorded with a second timespan.

According to some embodiments, the processor(s) are configured to: compute the confidence factor based on the first and second groups of recorded selections and wherein the second timespan is longer than the first timespan.

According to some embodiments, the processor(s) are configured to: assign a greater weight to the first group and a lesser weight to the second group when computing the confidence factor.

According to some embodiments, the processor(s) are configured to: not consider terrain modes selected during an interval between the computation of the confidence factor and the guidance display during future confidence factor computations.

According to some embodiments, the processor(s) are configured to: compute the confidence factor when a sensed vehicle speed exceeds a predetermined speed.

According to some embodiments, wherein the terrain mode switch enables user selection of one of a plurality of terrain modes, each of the terrain modes being associated with a different suspension tuning.

According to some embodiments, each of the plurality of terrain modes is mapped to a respective predetermined speed and the processor(s) are configured to: compute the confidence factor when a sensed vehicle speed exceeds the respective predetermined speed of the selected terrain mode.

According to some embodiments, the processor(s) are configured to: determine the road condition based on a sensed yaw rate and a sensed steering angle.

An example of a method of controlling a vehicle consistent with the present disclosure includes, in a vehicle including: a motor, sensors, steering, a suspension, a terrain mode switch, and processors; via the processors: implementing a selected terrain mode by tuning at least one of the motor, steering, and suspension; recording selected terrain modes; computing a confidence factor based on the recorded selections; determining a road condition based on the sensors; displaying guidance based on the confidence factor and the road condition.

According to some embodiments, the method includes: not computing the confidence factor based on selections recorded outside a calculated timespan.

According to some embodiments, the method includes: placing the recorded selections into first and second groups; the first group only including selections recorded within a first timespan, the second group only including selections recorded with a second timespan.

According to some embodiments, the method includes: computing the confidence factor based on the first and second groups of recorded selections, wherein the second timespan is longer than the first timespan.

According to some embodiments, the method includes: assigning a greater weight to the first group and a lesser weight to the second group when computing the confidence factor.

According to some embodiments, the method includes: not considering terrain modes selected during an interval between the computation of the confidence factor and the guidance display during future confidence factor computations.

According to some embodiments, the method includes: computing the confidence factor when a sensed vehicle speed exceeds a predetermined speed.

According to some embodiments, the method includes: the terrain mode switch enabling user selection of one of a plurality of terrain modes, each of the terrain modes being associated with a different suspension, steering, or motor tuning.

According to some embodiments, the method includes: each of the plurality of terrain modes being mapped to a respective predetermined speed and the method includes: computing the confidence factor when a sensed vehicle speed exceeds the respective predetermined speed of the selected terrain mode.

According to some embodiments, the method includes: determining the road condition based on a sensed yaw rate and a sensed steering angle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
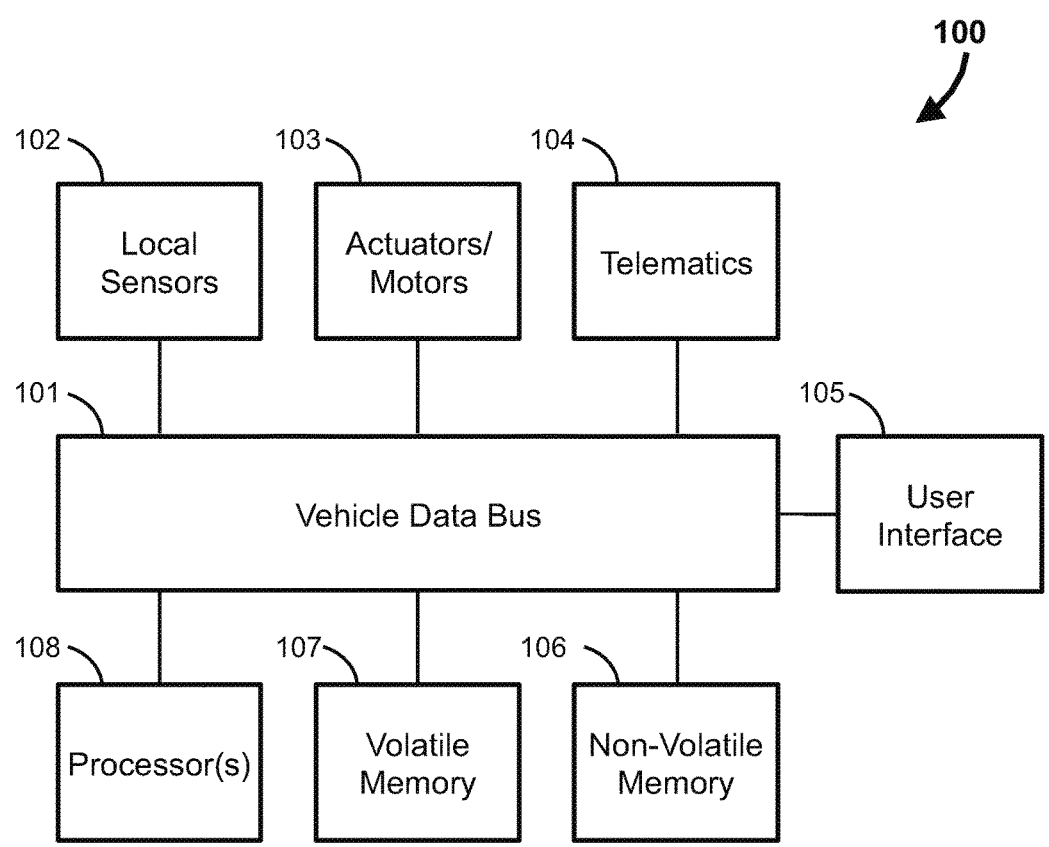
FIG. 1 is a block diagram of a vehicle computing system.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiment illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option. According to some embodiments, some or all of comparative terms (e.g., greater than, less than) relate to comparisons of magnitudes of some or all of the subjects under comparison. According to some embodiments, acceleration includes deceleration.

FIG. 1 shows a computing system 100 of first or host vehicle 200. First vehicle 200 may be autonomous, semi-autonomous, or traditional/manual. First vehicle 200 includes a motor, a battery, at least one wheel driven by the motor, and a steering system configured to turn the at least one wheel about an axis. First vehicle 200 may be fossil fuel powered (e.g., diesel, gasoline, natural gas), hybrid-electric, fully electric, fuel cell powered, etc.

Vehicles are described, for example, in U.S. patent application Ser. No. 14/991,496 to Miller et al. ("Miller"), U.S. Pat. No. 8,180,547 to Prasad et al. ("Prasad"), U.S. patent application Ser. No. 15/186,850 to Lavoie et. al. ("Lavoie"), and U.S. patent application Ser. No. 14/972,761 to Hu et al. ("Hu"), all of which are hereby incorporated by reference in their entireties. First vehicle 200 may include any of the features described in Miller, Prasad, Lavoie, and Hu.

Computing system 100 resides in first vehicle 200. Computing system 100, among other things, enables automatic control of mechanical systems within first vehicle 200 and facilitates communication between first vehicle 200 and external entities (e.g., connected infrastructure 301, the Internet, other connected vehicles 201). Computing system 100 includes a data bus 101, one or more processors 108, volatile memory 107, non-volatile memory 106, user interfaces 105, a telematics unit 104, actuators and motors 103, and local sensors 102.

Data bus 101 traffics electronic signals or data between the electronic components. Processor 108 performs operations on electronic signals or data to produce modified electronic signals or data. Volatile memory 107 stores data for near-immediate recall by processor 108. Non-volatile memory 106 stores data for recall to the volatile memory 107 and/or the processor 108. Non-volatile memory 106 includes a range of non-volatile memories including hard drives, SSDs, DVDs, Blu-Rays, etc. User interface 105 includes displays, touch-screen displays, keyboards, buttons, and other devices that enable user interaction with the computing system. User interface 105 includes switch 105a. Telematics unit 104 enables both wired and wireless communication with external entities via Bluetooth, cellular data (e.g., 3G, LTE), USB, etc.

Actuators/motors 103 produce tangible results. Examples of actuators/motors 103 include fuel injectors, windshield wipers, brake light circuits, transmissions, airbags, engines, power train motors, steering, etc. Local sensors 102 transmit digital readings or measurements to processors 108. Examples of local sensors 102 include temperature sensors, rotation sensors, seatbelt sensors, speed sensors, cameras, lidar sensors, radar sensors, infrared sensors, ultrasonic sensors etc. It should be appreciated that any of the various electronic components of FIG. 1 may include separate or dedicated processors and memory. Further detail of the structure and operations of computing system 100 is described, for example, in Miller, Prasad, Lavoie, and Hu.

Figure 2:
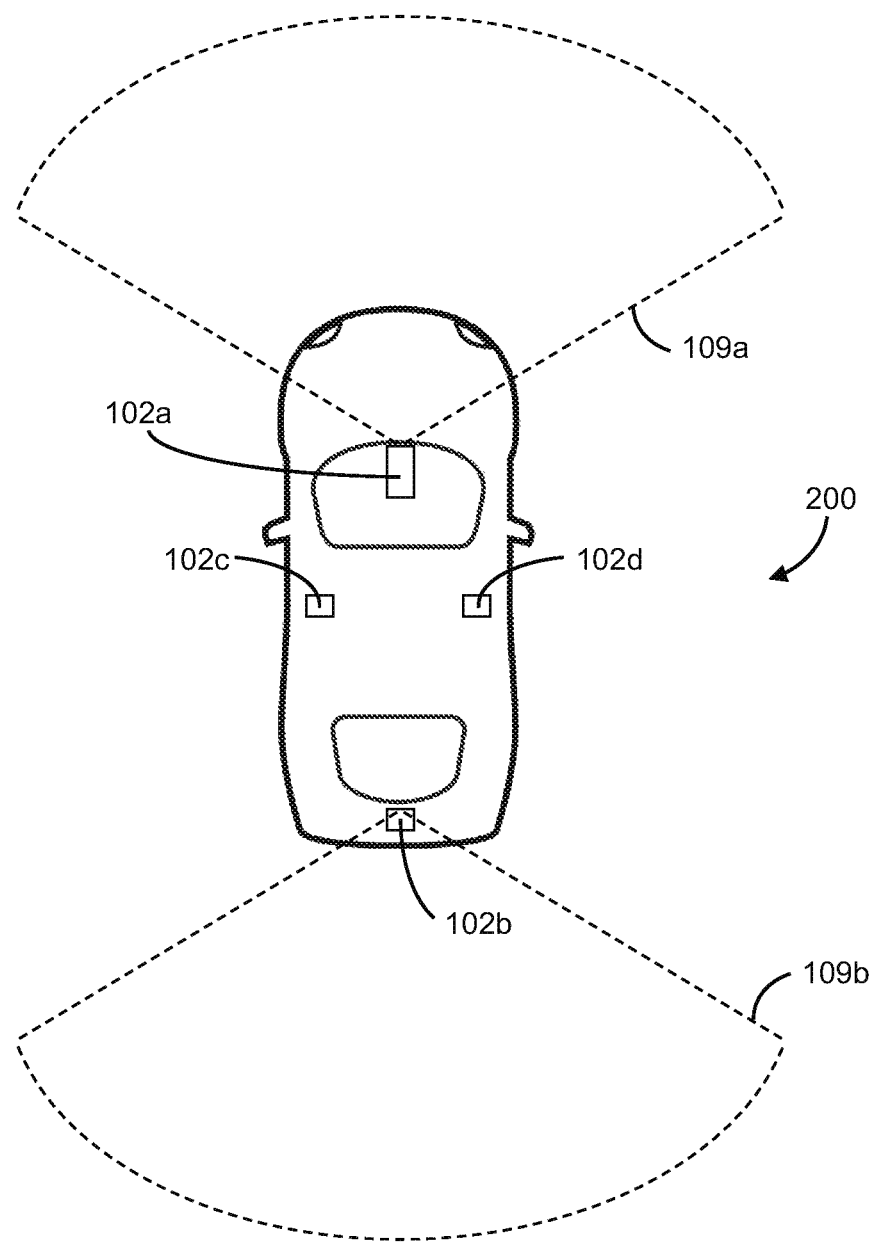
FIG. 2 is a top plan view of a vehicle including the vehicle computing system.
Figure 3:
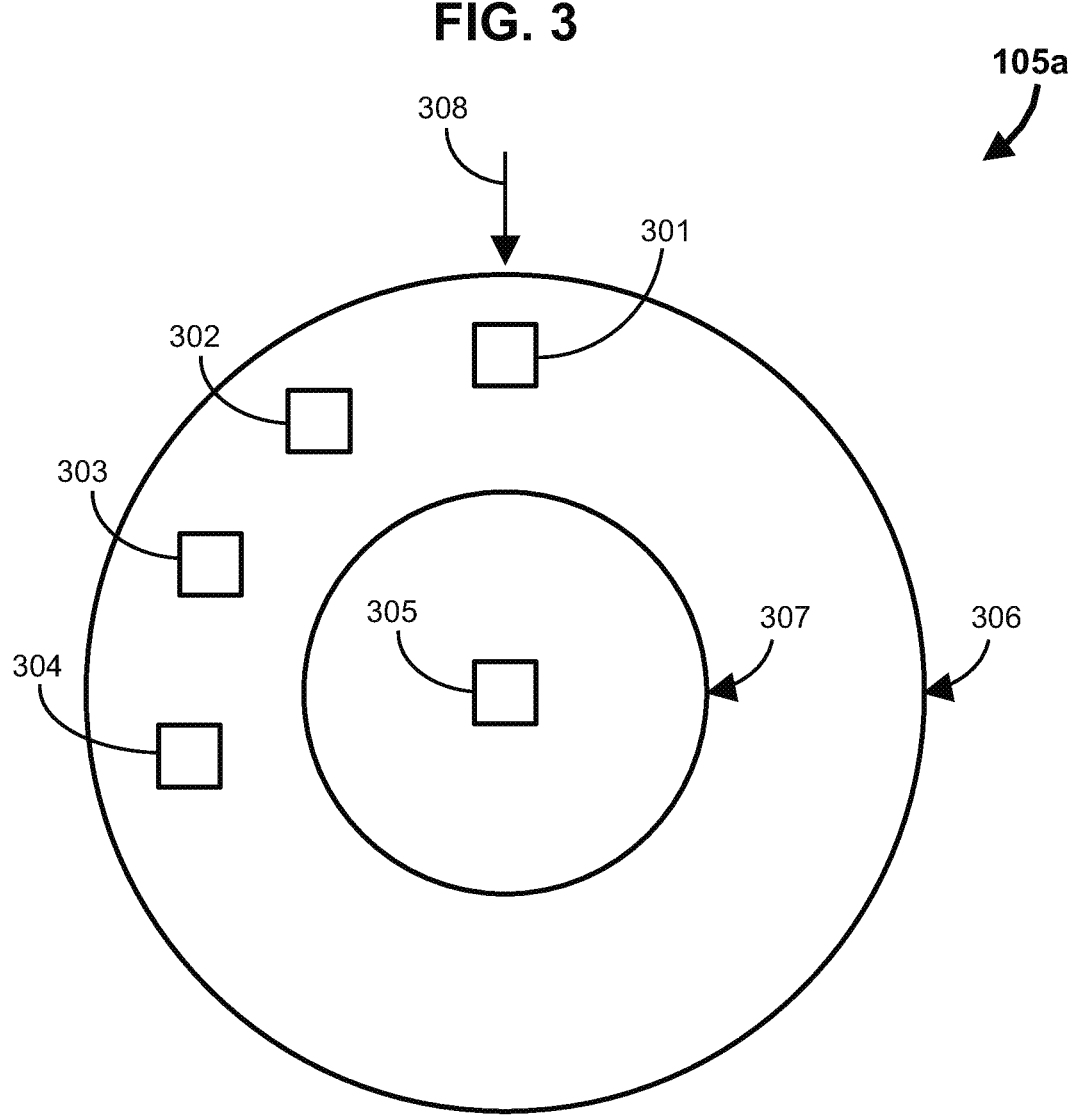
FIG. 3 is a schematic of an example terrain mode switch.

FIG. 2 generally shows and illustrates first vehicle 200, which includes computing system 100. Some of the local sensors 102 are mounted on an exterior of first vehicle 200 (others are located inside the vehicle 200). Local sensor 102a is configured to detect objects leading the vehicle 200. Local sensor 102b is configured to detect objects trailing the vehicle 200 as indicated by trailing sensing range 109b. Left sensor 102c and right sensor 102d are configured to perform similar functions for the left and right sides of the vehicle 200.

As previously discussed, local sensors 102a to 102d may be ultrasonic sensors, lidar sensors, radar sensors, infrared sensors, cameras, microphones, and any combination thereof, etc. First vehicle 200 includes a host of other local sensors 102 located in the vehicle interior or on the vehicle exterior. Local sensors 102 may include any or all of the sensors disclosed in Miller, Prasad, Lavoie, and Hu.

It should be appreciated that first vehicle 200 is configured to perform the methods and operations described herein. In some cases, first vehicle 200 is configured to perform these functions via computer programs stored on volatile 107 and/or non-volatile 106 memories of computing system 100.

A processor is "configured to" perform a disclosed method step or block at least when the processor is in operative communication with memory storing a software program with code or instructions embodying the disclosed method step or block. Further description of how processors, memory, and software cooperate appears in Prasad. According to some embodiments, a mobile phone or an external server in operative communication with first vehicle 200 perform some or all of the methods and operations discussed below.

According to various embodiments, first vehicle 200 includes some or all of the features of vehicle 100a of Prasad. According to various embodiments, computing system 100 includes some or all of the features of VCCS 102 of FIG. 2 of Prasad. According to various embodiments, first vehicle 200 is in communication with some or all of the devices shown in FIG. 1 of Prasad, including nomadic device 110, communication tower 116, telecom network 118, Internet 120, and data processing center 122.

The term "loaded vehicle," when used in the claims, is hereby defined to mean: "a vehicle including: a motor, a plurality of wheels, a power source, and a steering system; wherein the motor transmits torque to at least one of the plurality of wheels, thereby driving the at least one of the plurality of wheels; wherein the power source supplies energy to the motor; and wherein the steering system is configured to steer at least one of the plurality of wheels." The term "equipped electric vehicle," when used in the claims, is hereby defined to mean "a vehicle including: a battery, a plurality of wheels, a motor, a steering system; wherein the motor transmits torque to at least one of the plurality of wheels, thereby driving the at least one of the plurality of wheels; wherein the battery is rechargeable and is configured to supply electric energy to the motor, thereby driving the motor; and wherein the steering system is configured to steer at least one of the plurality of wheels."

First vehicle 200 includes terrain mode switch 105a. First vehicle 200 is thus configured to self-tune according to a user-selected mode 301 to 305 of terrain switch 105a. Although the background of the invention section lists tuning associated with each mode 301 to 305, it should be appreciated that modes 301 to 305 may be replaced or re-programmed as desired. Additional modes may be added. The structure of terrain mode switch 105a is only one example of a terrain mode switch 105a. Put differently, the present disclosure contemplates that terrain mode switch 105a may be arranged in any suitable manner. For example, terrain mode switch 105a may include a plurality of discrete terrain mode switches.

With reference to FIGS. 4 to 7, first vehicle 200 is configured to guide a user with respect to terrain mode switch 105a. More specifically, first vehicle 200 is configured to detect, estimate, approximate, or determine when a user is experiencing confusion with respect to terrain mode switch 105a and perform one or more solutions to resolve the user's confusion.

Figure 4:
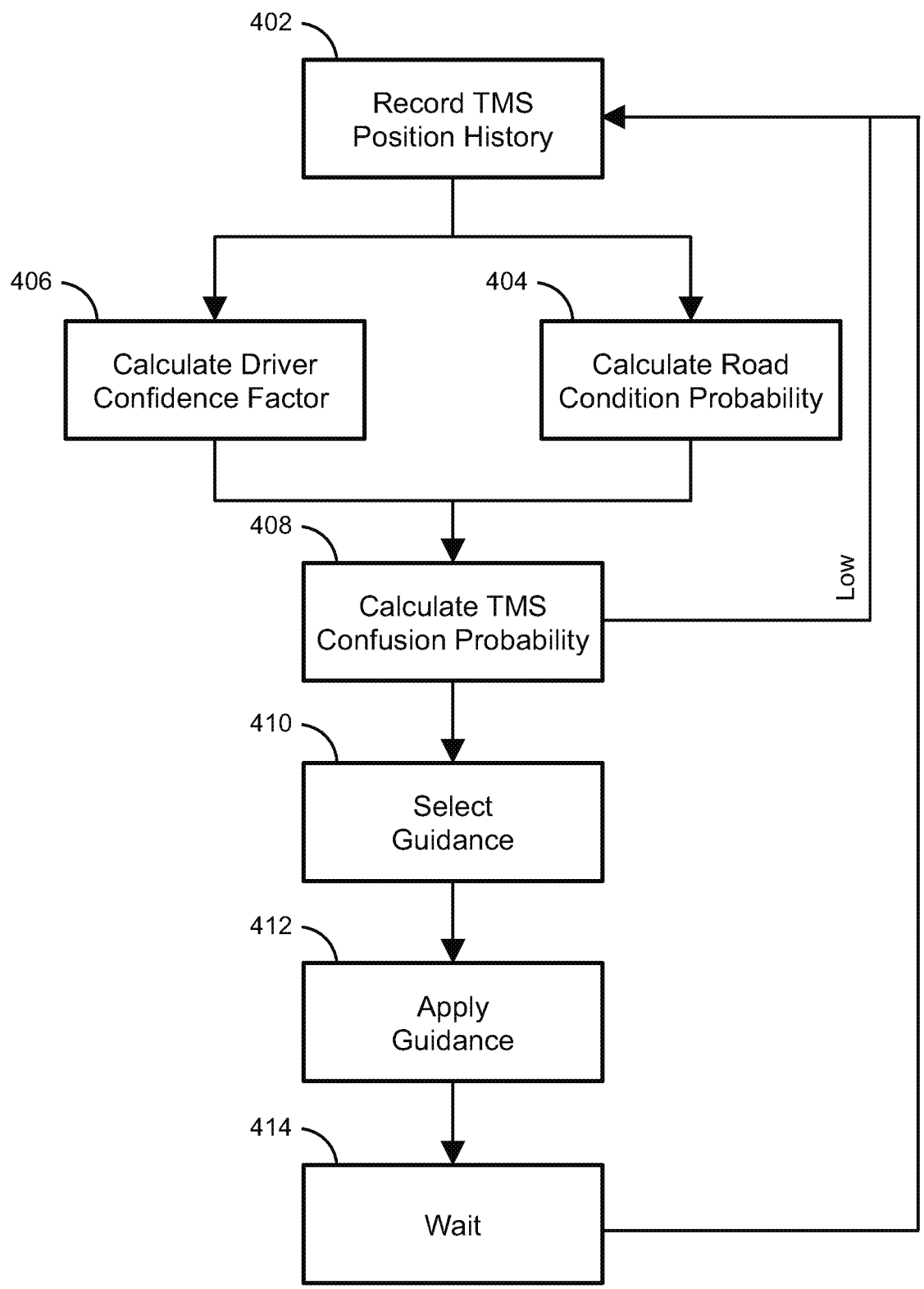
FIG. 4 is a block diagram of a method of selecting and applying guidance.

With reference to FIG. 4, first vehicle 200 records a history of terrain mode switch (TMS) 105a at block 402. At block 404, first vehicle calculates a road condition probability. At block 406, first vehicle 200 calculates a driver confidence factor based on at least a portion of the recorded TMS position history. At block 408, first vehicle 200 calculates a TMS confusion probability based on (a) the calculated driver confidence factor and (b) the calculated road condition probability. At block 410, first vehicle 200 selects guidance based on the calculated TMS confusion probability and a comparison. At block 412, first vehicle 200 applies the selected guidance. At block 414, first vehicle 200 waits a predetermined amount of time and then returns to block 402.

With respect to block 402, first vehicle 200 records and stores a predetermined number of most recent TMS positions. First vehicle 200 records and stores a newest TMS position when the user actuates TMS 105a. First vehicle 200 further records and stores a newest TMS position whenever first vehicle 200 selects a TMS mode on behalf of the user. For example, first vehicle 200 may be configured to automatically enter fourth mode 304 at the beginning of a new key cycle. Such automatic entry enhances fuel economy by reducing the possibility that the user unknowingly drives first vehicle 200 with one of modes 301 to 303 and 305 active. It should thus be appreciated that the terrain mode active in first vehicle 200 is not necessarily the terrain mode located under arrow graphic 308 given that first vehicle 200 may select a mode on behalf of the user. According to various embodiments, first vehicle 200 does not record, or separately records, TMS positions occurring during blocks 404, 406, 408, 410, 412, and 414. When first vehicle 200 separately records the TMS positions, first vehicle 200 may not consider the separately recorded TMS positions during future iterations of the method shown in FIG. 4.

Based on a detected presence of a trigger, first vehicle 200 performs blocks 404 and 406. Triggers may include one or more of: (a) a predetermined number of new terrain mode positions within a first predetermined time interval; (b) elapse of a second predetermined time interval, such that blocks 404 and 406 are periodically performed without reference to the recorded TMS position history; (c) entry into a TMS mode at an inappropriate or unexpected speed or acceleration. Each TMS mode 301 to 305 is associated with an entry speed or acceleration (e.g., first mode 301 is associated with a first entry speed or acceleration, second mode 302 is associated with a second entry speed or acceleration, etc.). If first vehicle 200 enters one of TMS modes 301 to 305 at a speed or acceleration exceeding the associated entry speed or acceleration, then trigger (c) is present.

Figure 6:
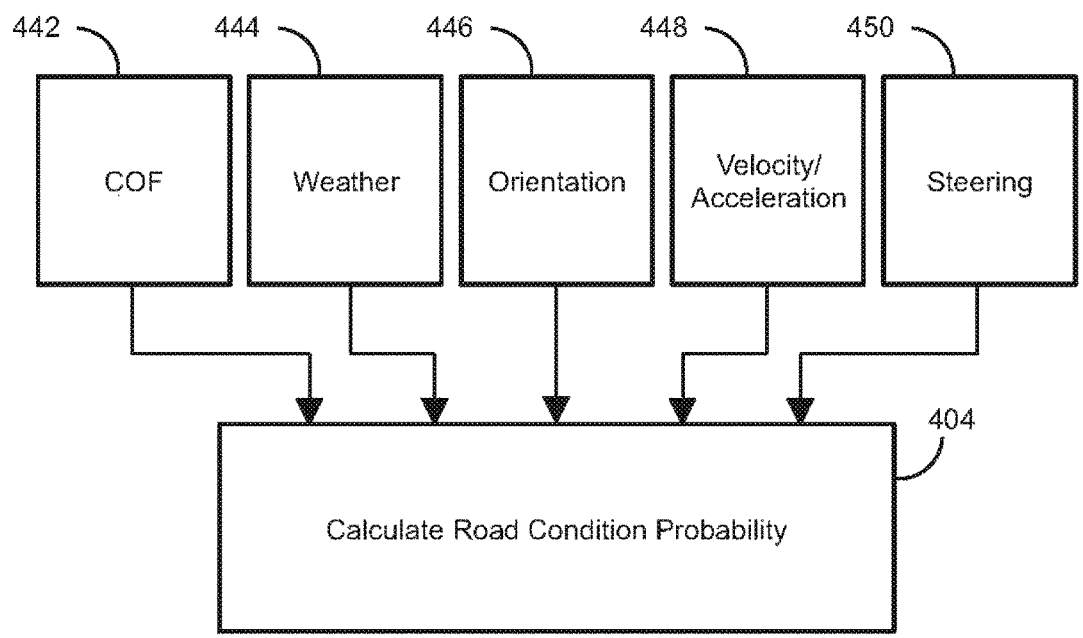
FIG. 6 is a block diagram of calculating road condition probability.

At block 404, first vehicle 200 calculates road condition probability. With reference to FIG. 6, road condition probability is based on (a) one or more surface coefficients of friction detected at block 442, (b) weather conditions detected at block 444, (c) orientation (e.g., three-dimensional heading) of first vehicle 200 detected at block 446, (d) velocity and/or acceleration of first vehicle 200 detected at block 448, (d) steering position or angle of first vehicle 200 detected at block 450.

Detection of surface coefficients of friction is generally known in the art and described, for example, in U.S. Pat. No. 6,866,349 to Sauter, U.S. Pat. No. 8,180,547 to Prasad, U.S. patent application Ser. No. 15/183,355 to Bidner, all of which are hereby incorporated by reference in their entireties. Detection of surface coefficients of friction is performed with local sensors 102 or is received from an external map server based on a current location of first vehicle 200. Detection of weather may be performed via local sensors 102 (e.g., moisture sensors, rain sensors, temperature sensors, etc.) or may be received from an external weather server. Detection of orientation is performed with one of more gyroscopes or accelerometers (i.e., local sensors 102). Orientation includes a three dimensional orientation of first vehicle 200. Detection of velocity/acceleration and steering is performed with local sensors 102.

At block 404, first vehicle 200 calculates a road condition probability based on one or more of blocks 442, 444, 446, 448, and 450.

First vehicle 200 may determine that first grass/gravel/snow mode 301 is appropriate (i.e., first vehicle 200 is traversing grass/gravel/snow) when: (a) the detected coefficient of friction is below a first predetermined coefficient of friction, (b) yaw rate of change (i.e., yaw speed) or magnitude thereof exceeds a first predetermined yaw speed, the first predetermined yaw speed being selected or calculated based on the detected steering angle and one or both of (i) one or both of the detected velocity and the detected acceleration of first vehicle 200, (ii) one or both of the detected velocity and the detected acceleration of one or more of the wheels of first vehicle 200 (i.e., wheel speed or wheel acceleration), (c) a detected change in acceleration and/or velocity or a magnitude thereof being less than a predetermined change in acceleration and/or velocity or magnitude thereof, the predetermined change being calculated based on a change in throttle (e.g., accelerator) position and/or the detected coefficient of friction.

According to some embodiments, first vehicle 200 assigns a probability that mode 301 is appropriate. The probability is based on (a) a magnitude of each of the above calculations, determinations, or detections exceeding the respective relevant predetermined thresholds and (b) a magnitude of each of the above calculations, determinations, or detections falling below the respective predetermined thresholds. According to various embodiments, each magnitude of excess and each magnitude of deficiency is assigned a respective predetermined weight. The probability is based on the weighted magnitudes. Excess positively correlates with the surface. Deficiency negatively correlates with the surface.

In this example, second sand mode 302 and third mud/ruts mode 303 cause first vehicle 200 to perform the same tuning functions. First vehicle 200 may determine that second sand mode 302 and/or third mud/ruts mode 303 is appropriate (i.e., first vehicle 200 is traversing sand and/or mud/ruts) when: (a) the detected coefficient is above a second predetermined coefficient of friction, the second predetermined coefficient of friction may be equal to the first predetermined coefficient of friction, (b) wheels along a single axle (e.g., the two rear wheels) are at different vertical positions such that a magnitude of a difference between a left wheel and a corresponding right wheel exceeds a predetermined value, and (c) yaw rate of change (i.e., yaw speed) falls below a second predetermined yaw speed, the second predetermined yaw speed being selected or calculated based on the detected steering angle or magnitude thereof and one or both of (i) one or both of the detected velocity and the detected acceleration or magnitudes thereof of first vehicle 200, (ii) one or both of the detected velocity and the detected acceleration of one or more of the wheels of first vehicle 200 (i.e., wheel speed or wheel acceleration) or magnitudes thereof, and (d) a detected change in acceleration and/or velocity or magnitude thereof is greater than a predetermined change in acceleration and/or velocity, the predetermined change being calculated based on a change in throttle (e.g., accelerator) position and/or the detected coefficient of friction. First vehicle 200 may calculate change in yaw with reference to orientation.

According to some embodiments, first vehicle 200 assigns a probability that mode 302 and/or 303 is appropriate. The probability is based on (a) a magnitude of each of the above calculations, determinations, or detections exceeding the respective relevant predetermined thresholds and (b) a magnitude of each of the above calculations, determinations, or detections falling below the respective predetermined thresholds. According to various embodiments, each magnitude of excess and each magnitude of deficiency is assigned a respective predetermined weight. The probability is based on the weighted magnitudes. Excess positively correlates with the surface. Deficiency negatively correlates with the surface.

First vehicle 200 may determine that fourth normal mode 304 is appropriate when each of the probabilities of modes 301, 302, and 303 are each below a predetermined normal mode probability threshold.

First vehicle 200 may determine that fifth hill descent control mode 305 is appropriate (i.e., first vehicle 200 is traveling downhill) when a vertical position of one or both of the rear wheels exceeds a vertical position of one or both of the front wheels by a predetermined distance. Alternatively, first vehicle 200 may determine that fifth hill descent control mode 305 is appropriate when orientation with respect to a horizontal axis exceeds a predetermined orientation. According to some embodiments, first vehicle 200 assigns a probability that mode 305 is appropriate by finding a magnitude of excess of differential vertical position over the predetermined distance.

At block 406, first vehicle 200 calculates a driver confidence factor. The driver confidence factor is based on a frequency or number of TMS position changes within a third predetermined time interval. The third predetermined time interval may be equal to the first predetermined time interval. The third predetermined time interval may be based on speed or acceleration of first vehicle 200. According to some embodiments, the third predetermined time interval is inversely related to speed and/or acceleration such that as speed and/or acceleration increases, said time interval decreases.

The driver confidence factor is further based on (a) a frequency of applied guidance within a fourth predetermined time interval, (b) a frequency of applied guidance within a fifth predetermined time interval, and (c) an identity of the user or driver (e.g., as detected by facial recognition technology, a connection with the user's mobile device, and/or the user's vehicle key). The fourth predetermined time interval may be relatively short (e.g., three minutes). The fourth predetermined time interval may begin when vehicle 200 first delivers guidance during a current key cycle. The fifth predetermined time interval may be relatively long (e.g., an accumulation of time of all key cycles of an identified user over a preset time span, such as three months) and thus relate to an overall experience and knowledge of the user. As the frequency of (a) and (b) increase, the driver confidence factor increases (i.e., a high driver confidence factor indicates a high probability of driver confusion).

Results of both blocks 404 and 406 are numerical values. At block 408, first vehicle 200 combines the numerical values according to a predetermined combination formula (e.g., addition and/or multiplication) to yield a TMS confusion probability or value. First vehicle 200 may adjust the result of the predetermined combination formula with a preloaded and user-selectable constant. Unconfident and inexperienced drivers select a high constant. Confident and experienced drivers select a low constant.

Figure 5:
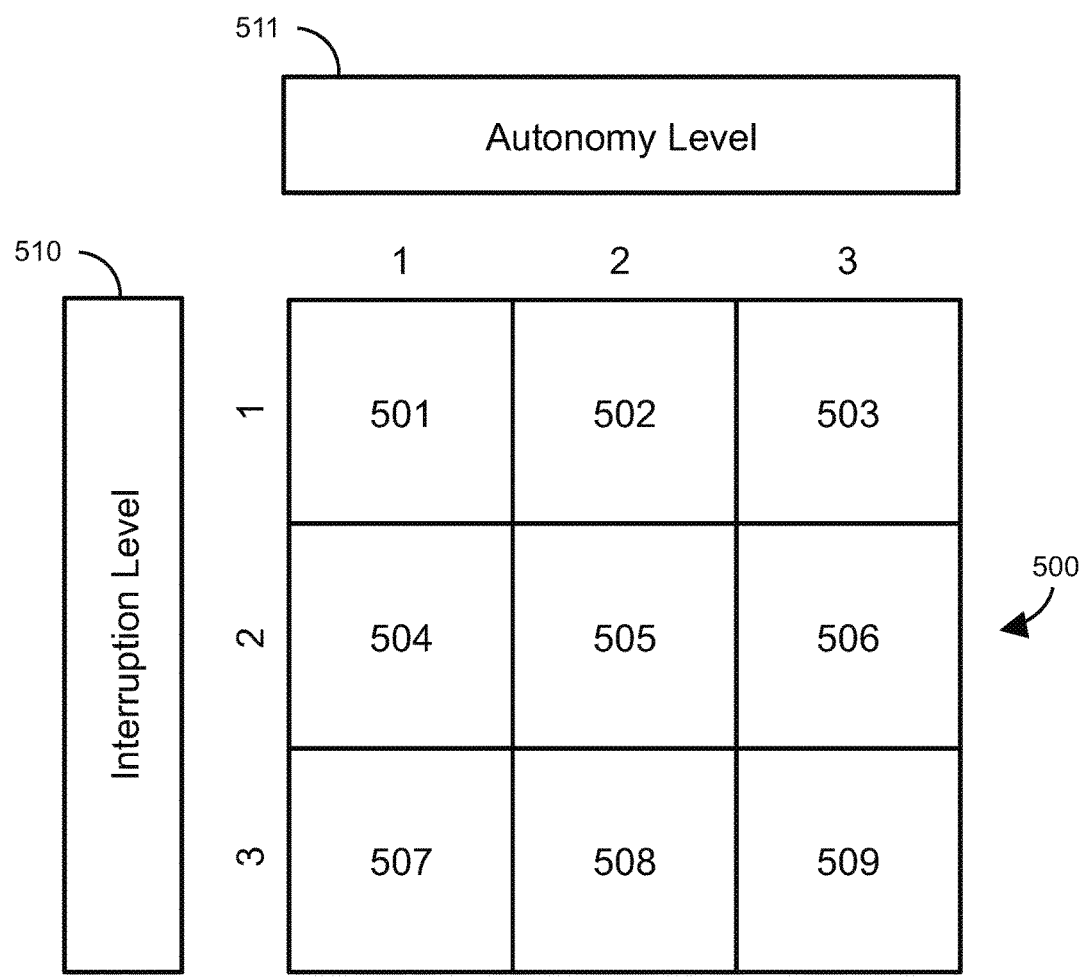
FIG. 5 is a lookup table.

With reference to FIG. 5, vehicle 200 includes a lookup table 500. Lookup table 500 includes a plurality of entries 501 to 509. Each entry is associated with (a) a particular TMS confusion probability or value and (b) guidance. Each entry is categorized by (a) an interruption level 510 and (b) an autonomy level 511.

The user selects a maximum interruption level and a maximum autonomy level. For example, the user may select a maximum interruption level of 2 and a maximum autonomy level of 3. Entries associated with an unselected category level are inactive. In this example, entries 507 to 509 are inactive. Entries associated with both selected category levels are active. In this example, entries 501 to 506 are active. First vehicle 200 selects one entry of the active entries according to the calculated TMS confusion probability or value. For example, first vehicle 200 may select the active entry having an associated driver confidence probability or value closest to the calculated TMS confusion probability or value.

At block 412, first vehicle 200 applies the guidance associated with the selected active entry in light of the most probable mode 301 to 303 (defaulting to mode 304 is modes 301 to 303 are each below the predetermined normal mode probability threshold) and whether hill descent mode 305 is appropriate. For example, entry 501 may correspond to a prompt or message on a vehicle display informing the user of the proper mode (the term mode contemplates one or more modes when hill descent control and one of modes 301 to 304 is appropriate). Entry 504 may correspond to the prompt or message on the vehicle display and an audio alarm. Entry 507 may correspond to the prompt or message, the beep, and an audio instruction. Entry 502 may correspond to first vehicle 200 automatically implementing the mode associated with the detected surface and displaying the prompt or message. Entry 505 may correspond to first vehicle 200 automatically implementing the mode associated with the detected surface, displaying the prompt or message, and generating the audio alarm. Entry 503 may correspond to first vehicle 200 automatically implementing the mode associated with the detected surface, automatically controlling acceleration, and the prompt or message.

It should thus be appreciated that according to some embodiments, as the interruption level increases, all previous actions associated with interruption are cumulatively performed (e.g., guidance associated with entry 707 includes all guidance associated with entries 704 and 701). Similarly, as the autonomy level increases, all previous autonomous actions associated with autonomy are cumulative performed (e.g., guidance associated with entry 503 includes all autonomous action associated with entries 501 and 502).

The invention claimed is:

1. A vehicle comprising:
a motor, sensors, steering, a suspension, a terrain mode switch, and processor(s) configured to:
implement a selected terrain mode by tuning at least one of the motor, the steering, and the suspension;
record selected terrain modes;
place the recorded selections into first and second groups, the first group only including selections recorded within a first timespan, the second group only including selections recorded with a second timespan, the second timespan being longer than the first timespan;
compute a confidence factor based on the first and second groups of the recorded selections;
determine a road condition based on the sensors; and
display guidance based on the confidence factor and the road condition.

2. The vehicle of claim 1, wherein the processor(s) are configured to not compute the confidence factor based on selections recorded outside a calculated timespan.

3. The vehicle of claim 1, wherein the processor(s) are configured to: assign a greater weight to the first group and a lesser weight to the second group when computing the confidence factor.

4. The vehicle of claim 1, wherein the processor(s) are configured to: compute the confidence factor when a sensed vehicle speed exceeds a predetermined speed.

5. The vehicle of claim 1, wherein the terrain mode switch enables user selection of one of a plurality of terrain modes, each of the plurality of terrain modes being associated with a different suspension tuning.

6. The vehicle of claim 1, wherein the processor(s) are configured to: determine the road condition based on a sensed yaw rate and a sensed steering angle.

7. A vehicle comprising:
processor(s) to:
implement a selected terrain mode by tuning at least one of a motor, steering, and a suspension;
record selected terrain modes;
compute a confidence factor based on the recorded selections;
determine a road condition based on vehicle sensors;
display guidance based on confidence factor and the road condition; and
not consider terrain modes selected between the computation of the confidence factor and the guidance display during future confidence factor computations.

8. The vehicle of claim 7, wherein the processor(s) are configured to place the recorded selections into first and second groups the first group only including selections recorded within a first timespan, the second group only including selections recorded with a second timespan.

9. The vehicle of claim 8, wherein the processor(s) are configured to: compute the confidence factor based on the first and second groups of recorded selections and wherein the second timespan is longer than the first timespan.

10. A vehicle comprising:
a motor;
sensors;
steering;
a suspension;
a terrain mode switch that enables user selection of one of a plurality of terrain modes, each of the plurality of terrain modes being associated with a different suspension tuning, each of the plurality of terrain modes being mapped to a respective predetermined speed; and
processor(s) configured to:
implement a selected terrain mode by tuning at least one of the motor, the steering, and the suspension;
record selected terrain modes;

compute a confidence factor based on the recorded selections when a sensed vehicle speed exceeds the respective predetermined speed of the selected terrain mode;

determine a road condition based on the sensors; and display guidance based on the confidence factor and the road condition.

11. A method of controlling a vehicle, the vehicle comprising a motor, sensors, steering, a suspension, a terrain mode switch, and processors, the method comprising, via the processors:

implementing a selected terrain mode by tuning at least one of the motor, steering, and suspension;

recording selected terrain modes;

placing the recorded selections into first and second groups, the first group only including selections recorded within a first timespan, the second group only including selections recorded with a second timespan, the second timespan being longer than the first timespan;

computing a confidence factor based on the first and second groups of the recorded selections;

determining a road condition based on the sensors;

displaying guidance based on the confidence factor and the road condition.

12. The method of claim 11, comprising: not computing the confidence factor based on selections recorded outside a calculated timespan.

13. The method of claim 11, comprising: assigning a greater weight to the first group and a lesser weight to the second group when computing the confidence factor.

14. The method of claim 11, comprising: computing the confidence factor when a sensed vehicle speed exceeds a predetermined speed.

15. The method of claim 11, wherein the terrain mode switch enables user selection of one of a plurality of terrain modes, each of the plurality of terrain modes being associated with a different tuning of the suspension, the steering, or the motor.

16. The method of claim 11, comprising: determining the road condition based on a sensed yaw rate and a sensed steering angle.

17. A method comprising:

implementing a selected terrain mode by tuning at least one of a motor, steering, and suspension;

recording selected terrain modes;

computing a confidence factor based on the recorded selections;

determining a road condition based on vehicle sensors;

displaying guidance based on the confidence factor and the road condition; and not considering terrain modes selected between the computation of the confidence factor and the guidance display during future confidence factor computations.

18. A method of controlling a vehicle, the vehicle comprising a motor, sensors, steering, a suspension, a terrain mode switch, and processors, the method comprising, via the processors:

implementing a selected terrain mode by tuning at least one of the motor, the steering, and the suspension, wherein the terrain mode switch enables user selection of one of a plurality of terrain modes, each of the plurality of terrain modes being associated with a different tuning of the suspension, the steering, or the motor, each of the plurality of terrain modes being mapped to a respective predetermined speed;

recording selected terrain modes;

computing a confidence factor based on the recorded selections when a sensed vehicle speed exceeds the respective predetermined speed of the selected terrain mode;

determining a road condition based on the sensors;

displaying guidance based on the confidence factor and the road condition.

19. The method of claim 18, comprising placing the recorded selections into first and second groups, the first group only including selections recorded within a first timespan, the second group only including selections recorded with a second timespan.

20. The method of claim 19, comprising: computing the confidence factor based on the first and second groups of recorded selections, wherein the second timespan is longer than the first timespan.

* * * * *